Jan. 24, 1939. G. B. BENANDER 2,145,107
TRAY
Filed July 15, 1937

Inventor:
George B. Benander,
by Harry E. Dunham
His Attorney.

Patented Jan. 24, 1939

2,145,107

UNITED STATES PATENT OFFICE 2,145,107

TRAY

George B. Benander, Yalesville, Conn., assignor to Monowatt Electric Corporation, Bridgeport, Conn., a corporation of Connecticut Application July 15, 1937, Serial No. 153,782

13 Claims. (Cl. 219—19)

This invention relates to trays, more particularly to portable electric service trays for receiving and supporting electrically heated cooking appliances, such as coffee makers, toasters, waffle irons, grills and the like, and it has for its object the provision of an improved device of this character.

This invention contemplates an improved electric serving tray having a single electrical supply cord and a plurality of outlets arranged to connect the terminals of the various heating appliances to the single supply cord so that several can be operated simultaneously on the tray. The outlets are arranged to accommodate heating appliances having various terminal heights.

This invention also contemplates an improved electrical tray having its electrical supply cord and outlets arranged so that the upper surface of the tray is plane and uninterrupted. That is, the tray is so arranged that its supporting surface is free for use as a conventional tray for serving food and beverages.

Figure 1:
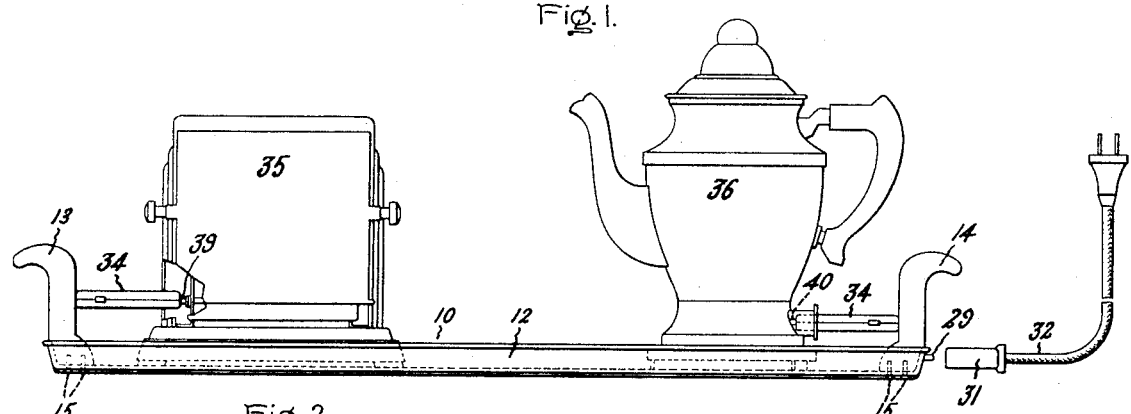
Figure 1:
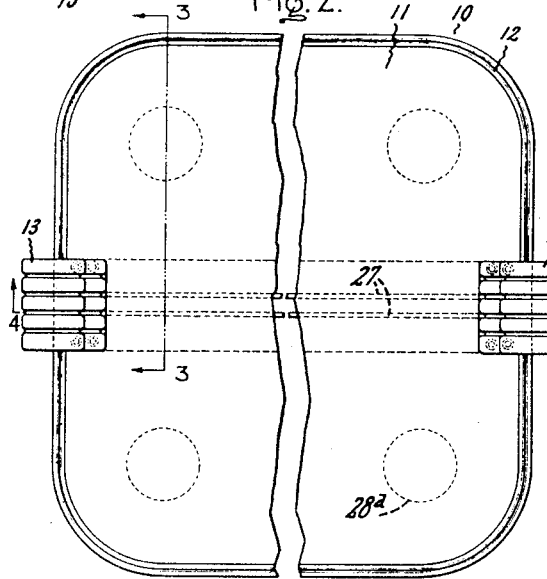
Figure 1:
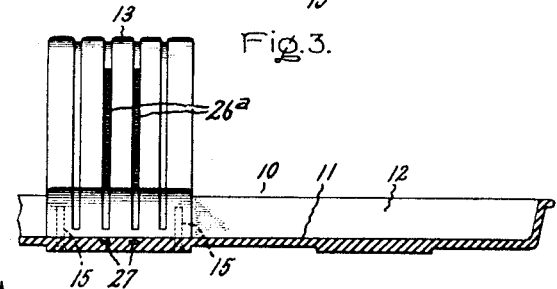
Figure 1:
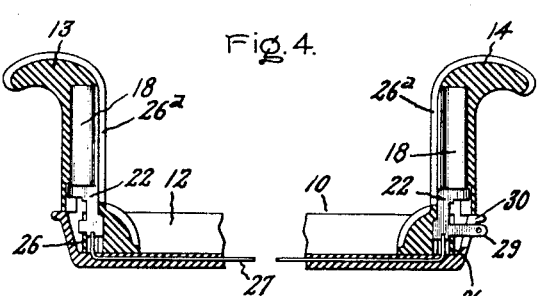
Figure 1:
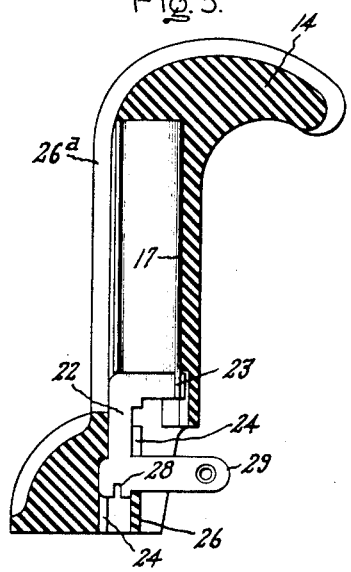
Figure 1:
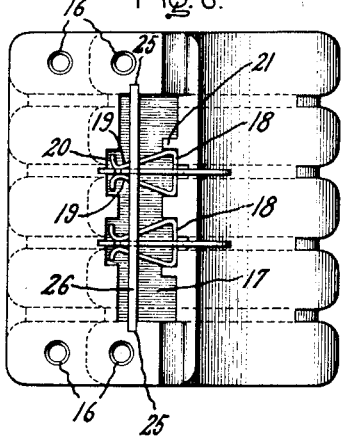
Figure 1:
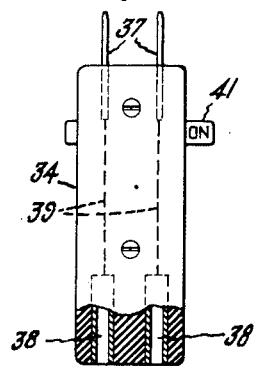

For a more complete understanding of this invention, reference should be had to the accompanying drawing in which Fig. 1 is a front elevation of an electric serving tray embodying this invention and showing heating appliances in operative position on the tray; Fig. 2 is a fragmentary plan view of the serving tray of Fig. 1 with the electrical appliances removed; Fig. 3 is an enlarged sectional view taken through the line 3—3 of Fig. 2 and looking in the direction of the arrows; Fig. 4 is an enlarged sectional view taken through the line 4—4 of Fig. 2 and looking in the direction of the arrows; Fig. 5 is a still larger sectional view illustrating one of the supporting handles for the tray; Fig. 6 is a bottom plan view of the handle shown in Fig. 5; and Fig. 7 is a plan view of an electrical plug used in the serving tray of Figs. 1-6 having parts shown in section so as to illustrate certain details of construction.

Referring to the drawing, this invention has been shown in one form as applied to an electric serving tray for electrically heated devices comprising a supporting body 10 having in general a rectangular form. The supporting body 10 while it is shown rectangular may have any suitable shape; thus it may be square or it may have a curved contour. The supporting body 10 has a plane uninterrupted supporting surface 11 which is bound on its edges by an upright flange 12. The supporting body 10 comprising the supporting portion 11 and the flange 12 surrounding the supporting surface 11 are formed of a suitable electrically insulating material, such as a phenol condensation product reenforced in any suitable manner as by means of a woven material incorporated with it. Preferably, the body 10 and flange 11 will be formed integrally with each other, and preferably they will be molded from the insulating material.

Arranged at the opposite ends of the supporting surface 11, preferably mid-way between the sides of the tray, are a pair of supporting handles 13 and 14. The handles 13 and 14 also preferably will be formed of an electrically insulating material, such as the material of which the supporting body 11 and flange 12 are formed. The handles, however, preferably will not be formed integrally with the body of the tray but will be formed as separate members. They rest upon the surface 11 and are secured to it by means of screw fastening means 15 directed upwardly through the body 11 and received in threaded apertures 16 provided for them in the handles.

Each of the handles 13, 14 is provided with a vertically elongated cavity 17 in which is positioned a pair of spring contact or terminal members 18. Each of the contact members 18 is provided with a pair of spring contact blades 19 arranged to receive between them a terminal pin, as will be described in greater detail hereinafter. Each contact receptacle or terminal 18 is supported against lateral movement at the forward end, that is the end facing the body of the tray, by a recess 20 formed in the handle, and at the opposite end by tongues 21. Connected to the bottom of the member 18 is a tongue 22 which is soldered or otherwise suitably electrically and mechanically connected with strips 23 secured to and depending from the blade, as shown in Fig. 5. The handle is provided with a slot 24 receiving the tongue 22. It is also provided with oppositely positioned slots 25 which receive a supporting bar 26 positioned under the tongue 22, as shown clearly in Figs. 5 and 6. The inner wall of each handle facing the supporting surface 11 is provided with a pair of spaced-apart vertical slots 26a extending into the cavities 17 and opposite the contact members 18 through which terminal members may be inserted into the contacts between their blades.

The two contacts 18 of each handle are electrically connected with the corresponding contacts of the other handle by electrically conducting strips 27 embedded in the insulating body 10, as clearly shown in Figs. 3 and 4. The ends of the strips 27 are turned upwardly into the cavities of the handles where they are electrically connected with the tongues 22. For the purpose of making the connections, the tongues 22 are provided with slots 28 which receive the upturned ends of the strips, as clearly shown in Fig. 4.

Preferably, the part of the tray through which the strips 27 are received will be relatively thickened, as shown in Fig. 3. When this is done, the tray will be provided with a number of spaced-apart feet 28a arranged to support the tray in a level position.

One set of the contact tongues 22, the right-hand set, as viewed in Fig. 4, is provided with terminal pins 29 which are accessible through an opening 30 provided for them in the adjacent wall of the flange 12, as shown in Fig. 4, so that a suitable plug 31 of a conventional twin supply conductor 32 may be applied to the pins for the purpose of connecting the tray with an electrical supply source (not shown).

Suitable connector members 34 are arranged to be interposed between the handles 13 and 14 and suitable electrically heated appliances on the surface 11 that are provided with heating elements and terminals, such as a toaster 35 and a coffee maker 36. The plug 34 carries a pair of spaced terminal pins 37 which are adapted to be inserted through the slots 26a so as to be received between the blades 19 of the contact springs 18. The plug 34 is also provided with a pair of spaced sockets 38 opposite the pins 37 and electrically connected with them by means of conductors 39. The receptacles 38 are adapted to be applied to the terminal pins 39 and 40 of the electrical appliances 35 and 36.

If desired, the plug 34 may be provided with an on and off switch (not shown) having an operating member 41. This switch has not been shown in detail because the specific details of its construction form no part of this invention.

It will be observed that the terminal pins 37 of the plug 34 may be applied to the contact springs 19 at various heights within the limits of the vertical dimensions of the slots 26a. Thus, the terminals 18 are accommodated to appliances having various terminal heights. For example, as shown in Fig. 1, the terminals 40 of the percolator 36 are positioned at a somewhat lower level than are the terminals 39 of the toaster 35. Similarly the plugs 34 may be adjusted to other appliances, such as waffle irons and grills that have terminals at heights which differ from the heights of the terminals of the percolator and toaster shown.

It will be observed that the terminals are so arranged that substantially the entire supporting surface 11 of the tray is free for receiving the appliances. When the appliances 35 and 36 are removed, this surface 11 may be used for general serving purposes for foods, beverages and the like.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. An electric service tray for supporting electrically heated appliances and the like comprising a body having a substantially plane supporting surface, spaced handles attached to said body having hand grasping portions, electrical supply terminals within said handles arranged to be connected electrically to the terminals of said appliances, a set of electrical supply terminals for said tray, and electrical connections between said supply terminals and the terminals on said spaced handles.

2. An electric-service tray comprising a body having a surface for supporting electrically heated appliances and the like, handles attached to opposite edges of said body, terminals supported by said handles, a set of supply terminals mounted in one of said handles in a position removed from said supporting surface, and electrical connections between said set of supply terminals and those supported by said one handle and also between said supply terminals and those supported by the other handle.

3. An electric service tray for electrically heated appliances and the like having terminal pins comprising a body having a supporting surface for said appliances, handles for said tray attached to said body, one of said handles having vertically elongated slots to receive the terminals of appliances that have various terminal heights, vertically elongated terminals in said one handle accessible through said slots and arranged to engage said terminals when they are inserted, and means for connecting said terminals with a source of electrical supply.

4. An electric service tray for electrically heated appliances and the like having terminal pins comprising a body having a supporting surface for said appliances, terminals on said trays having vertically elongated sockets, a set of supply terminals connected with said sockets, and a plug having terminal pins arranged to be inserted in said sockets at various heights within the vertical limits of said sockets, and the plug also having receptacles adapted to receive said terminal pins of said appliances, whereby appliances having various terminal heights may be electrically connected with said sockets.

5. An electric service tray for electrically heated appliances and the like having electric supply terminals comprising a supporting body for said appliances, a set of vertically elongated terminals above the supporting surface of said body, a set of supply terminals carried by said tray electrically connected with said elongated terminals, and a plug constructed and arranged to be interposed between said elongated terminals and appliances having two sets of interconnected terminals, one set to be connected with the terminals of said appliances and the other to said elongated terminals and at any position within the vertical limits of said terminals.

6. An electric service tray for electrically heated appliances and the like comprising a body formed of an electrically insulating material and having a supporting surface for said appliances, a plurality of handles attached to said body also formed of an electrically insulating material, sets of electrical terminals mounted within said handles adapted to be connected to the terminals of heating appliances mounted on said surfaces, a set of supply terminals supported by said tray and connected with terminals in one of said handles, and electrical connections embedded within said body connecting said set of supply terminals and the set of terminals in the other of said handles.

7. An electric serving tray for electrically heated appliances and the like having sets of spaced terminal pins comprising a supporting body and handles formed of an electrically insulating material, the handles having vertically elongated cavities and spaced vertical slots entering said cavities, vertically positioned contact blades within said cavities positioned to engage terminal pins inserted through said slots, a plug having a set of terminal pins arranged to be inserted through said slots for contact with said blades and a set of receptacles connected with said pins and arranged to receive the terminal pins of said appliances, electrical connections between said contact blades of the various handles embedded within said body, and a set of supply terminals connected to one set of said contact blades.

8. An electric serving tray for electrically heated appliances and the like having sets of spaced terminal pins comprising a supporting body and handles, the handles having vertically elongated cavities and spaced vertical slots entering said cavities, vertically positioned contact blades within said cavities positioned to receive between them terminal pins inserted through said slots, a plug having a set of terminal pins arranged to be inserted through said slots for contact with said blade and a set of receptacles connected with said pins and arranged to receive the terminal pins of said appliances, electrical connections between said contact blades of the various handles, and a set of supply terminals connected to one set of said contact blades.

9. An electric service tray for electrically heated appliances and the like comprising a supporting body for said appliances, handles for said body having vertically elongated cavities having openings at the bottom, electrical terminals inserted into said cavities through said bottom openings, the terminals having their lower ends facing said openings, and supporting strips mounted in said openings and engaging said lower ends so as to hold said contacts in said cavities.

10. An electric service tray comprising a body having a surface for supporting electrically heated appliances and the like and a flange surrounding said surface, handles adjacent said flange, one of the handles having a set of electrical terminals elevated above said surface and adapted to be connected to the terminals of an appliance placed on said surface, a set of supply terminals mounted on said one of said handles and accessible on its side opposite said surface through the flange, and electrical connections between said supply terminals and those in said handle.

11. An electric service tray comprising a body having a surface for supporting electrically heated appliances and the like and a flange surrounding said surface, handles adjacent said flange, one of the handles having a set of electrical terminals elevated above the suporting surface and adapted to be connected to the terminals of an appliance placed on said surface, the flange having an opening opposite said one of said handles, a set of supply terminals mounted on said one handle and projecting through said opening, and electrical connections between said supply terminals and those in said handle.

12. An electric service tray for electrically heated appliances and the like comprising a supporting body for said appliances, handles for said body having vertically elongated cavities having openings at the bottom, pairs of electrical terminals in said handles having slots in their lower ends, conducting strips below the supporting surface of said body and between said handles having sections received in said slots to electrically interconnect the pair of terminals in said handles, and supply terminals connected to one of the pairs of terminals in one of said handles.

13. An electric service tray for electrically heated appliances and the like comprising a supporting body for said appliances, handles for said body, electrical terminals in said handles having slots in their lower ends, and conducting strips embedded in said body and extending between said handles, the ends of said strips being turned upwardly so as to be received in said slots to electrically interconnect the terminals of the handles in pairs, and electrical supply terminals connected with a pair of the terminals in one of said handles.

GEORGE B. BENANDER.